Figure 1:
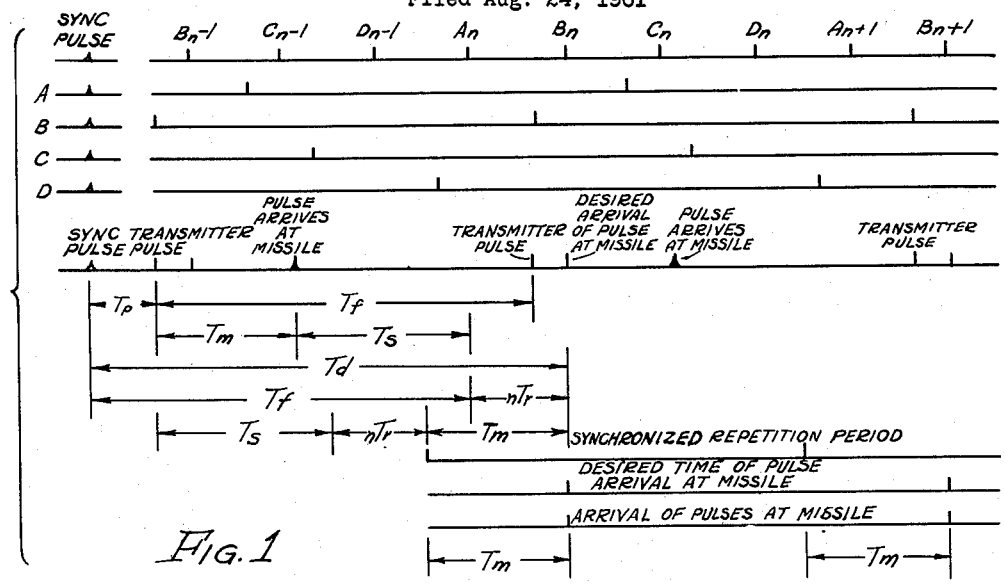

Sept. 22, 1964

A. J. LISICKY 3,150,370

RADAR SEQUENCER

Filed Aug. 24, 1961

INVENTOR.
ANTON J. LISICKY

BY

*H. H. Loscke*

ATTORNEYS

3,150,370
RADAR SEQUENCER

Anton J. Lisicky, Haddonfield, N.J., assignor, by mesne assignments, to the United States of America as represented by the Secretary of the Navy
Filed Aug. 24, 1961, Ser. No. 133,751
9 Claims. (Cl. 343—17.1)

This invention relates to a radar sequencer and more particularly to a radar sequencer circuit means which will permit a missile to receive pulses from a chain of radars at known intervals of time even though the ranges from the missile to the radars are changing. The device has immediate application to missile ranging where beacon stealing is a problem.

When a missile is being tracked by a number of radars, the time of arrival of the transmitted pulses at the missile is important. For example, if a beacon is being utilized in the missile, any pulse which arrives at the missile while the beacon is responding to a previous pulse or is still in its recovery cycle, will have no effect. It is possible for one radar to steal the beacon return from another radar. These difficulties can be avoided if the pulses are made to arrive at the missile at fixed and spaced time intervals. This appears to be a formidable problem since the range from the missile to the various radars is always changing.

In the present invention a radar sequencer circuit is used in the radar synchronizing pulse circuit to synchronize a chain of radars for pulse transmission to delay the transmitted pulses in a manner to cause the transmitted pulses to arrive at the missile in spaced time intervals. It is to be understood that to accomplish the above all radars should operate at the same repetition rate, each radar should have the range to the missile in binary form, and the synchronous pulse occurring approximately once every second should be available to all radars in the chain for one mode of operation of the device. The sequencer circuit includes a plurality of bistable multivibrators, "and," and "or" gates in combination with a sequence counter to produce a proper delay in the synchronous pulses for each radar in the chain to cause the radar transmitted pulses of the radars in the chain to arrive at the missile in the desired spaced intervals of time. Repetition triggers or transmitted pulses must be available from each radar, and clock pulses or constant frequency pulses must be generated and available to the sequencer circuit. In another mode of operation of the device where an $n$th time around target is being tracked, it is possible for the sequencer circuit to have the transmitter pulse to arrive at the missile, not at the desired time as provided for above, but one-half repetition period later. For a more complete discussion of radars having a sufficiently high pulse repetition frequency to cause "second time around" or "$n$th time around" signals, see the Radiation Laboratory Series of Massachusetts Institute of Technology, 1947 edition, volume 1 on "Radar System Engineering," by Louis N. Ridenour, chapter 4, Section 4.1, particularly pages 116 and 117. This occurs when an even time around echo missile is being tracked. That is, there are times when the reception of an echo and the transmission of a pulse will occur simultaneously. This must be avoided since the radar will lock on to the transmitted pulse because the leak through energy of the transmitted pulse exceeds the energy of the echo. An even and odd zone indicator means is used in the radar circuit to introduce delays which alternate between the transmitter circuit and the range gate circuits to avoid this interference problem without losing any echoes or stopping the transmission of pulses. The even and odd zone indicator is also necessary when the sequencer is used in the radar tracking in the $n$th time around mode. For example, if the target is at the end of a range zone established by the even and odd zone indicator with the range indication in binary form, this range information may be all "ones." The most significant bits are excluded which identify the zones whereupon these significant bits are not transferred to the sequence counter. If the target range should change by two yards, and thereby move into a new zone, the least significant bits will become zeros while the most significant bits will change. Since the least significant bits are transferred into the sequence counter, it should be obvious that an error will occur in the timing of the transmitted pulses of the radar unless a delay of one-half the radar repetition period is in the even zones. This is accomplished by utilizing the even zone indicator signal of each radar to recondition the sequence counter of that radar to add in additional clock pulse count equivalent to one-half the repetition period thereby delaying the synchronizing pulse the desired amount and by one-half the repetition period. The odd and even zone indicator means used in connection with the radars A, B, C, and D, form no part of this invention, only the signal therefrom being used in the sequencer circuit. It is therefore a general object of this invention to synchronously trigger a chain of radars tracking a missile in a manner to cause the radar pulses to arrive at the missile in a desired time interval sequence to avoid gate stealing and echo-transmission interference.

Figure 2:
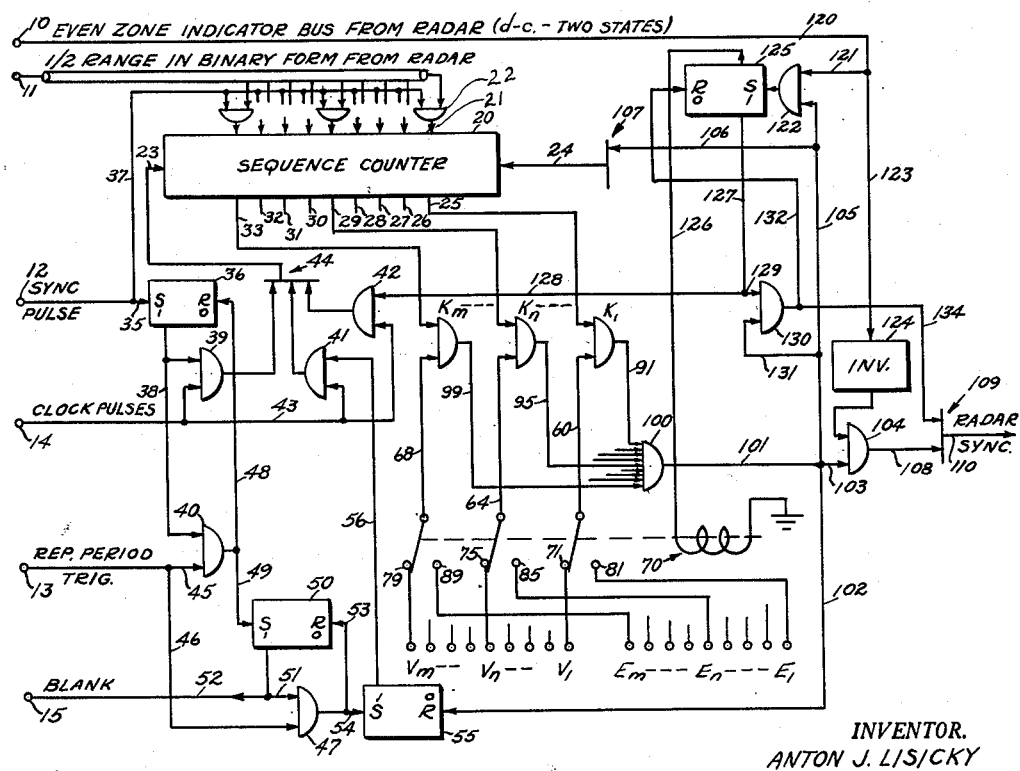

These and other objects, advantages, features, and uses may become more apparent to those skilled in the art as the description proceeds with reference to the drawings, in which:

FIGURE 1 is a timing diagram illustrating the desired pulse arrival sequence at the missile using one of four radar pulse timing patterns as an example, and FIGURE 2 is a block circuit diagram of the radar sequencer circuit of this invention.

Referring more particularly to FIGURE 1, the top line illustrates the desired sequence of arrival at a missile of transmitted pulses from four radars triggered by delayed synchronous pulses. Lines A, B, C, and D illustrate the synchronous pulses with respect to the transmitted pulses of the four radars prior to any sequential control. The sixth line illustrates the sequence of events from the synchronous pulse of radar B, these events being the transmitter pulse, the pulse arrival time at the missile and the desired arrival time of the pulse at the missile. Various symbols are used in this figure to indicate time intervals between the happening of certain events, these symbols being defined as follows:

$Tp$ is the time between the synchronous pulse and the first repetition rate trigger to occur after the synchronous pulse.

$Tm$ is the time taken for the radar pulse to reach the missile (equal to one-half the range reading).

$Ts$ is designated as the delay time introduced by the sequencer circuit.

$nTr$ is designated as the fixed delay to be assigned to each radar in the chain. $n=0$, 1, 2, 3, and $nTr < Tf$.

$Tf$ is the repetition period of the radar.

$Td$ represents the desired time of arrival of the pulse at the missile after the occurrence of the synchronous trigger pulse.

Referring more particularly to FIGURE 2, with occasional reference to FIGURE 1 for determining the timing sequence and relative position of pulse signals, each radar, A, B, C, and D, referred to herein, includes a radar sequencer circuit to time its operation, although a more or less number of radars may be used. For the purpose of illustration and description of each sequencer circuit, a radar, such as radar B in the example of FIG- URE 1, supplies the following information to the sequencer circuit: range information of the missile in binary form through a cable represented as being connected at the terminal block 11, synchronous pulses at the terminal 12 which are applied to all radar sequencer circuits alike, and repetition period trigger pulses or radar trigger pulses at terminal 13. The circuit applying synchronous pulses to radars A, B, C, and D, is connected to the sequencer circuit so that each original synchronous pulse, applied as to terminal 12, becomes a synthetic delayed synchronous pulse on the output of the sequencer circuit to delay transmission of radar pulses. Consequently, the delayed transmitter pulses establishes a pulse repetition frequency the same as the original frequency but delayed in time of occurrence. Constant frequency pulses referred to herein as "clock pulses" may be supplied from any desirable source to the terminal 14. Such synchronous or "clock pulses" are commonly used to trip counter or computer circuits at the proper time and in the proper sequence as more fully explained in the text, Fundamentals of Digital Computers, by Mathew Mandl, 1958, particularly page 41. The above mentioned pulses and electrical information supplied to the identified terminals are produced by devices in the radar well understood by those skilled in the radar art and will not be described in detail since they, as individual devices, form no part of this invention. Blanking pulses from the sequence counter circuit may be supplied back to radar B, herein shown as being to the terminal 15 adapted to be coupled to such radar B. It is to be noted that in the use of binary numbers division by two can be readily accomplished by shifting the binary number one frame toward the least significant number. Since the range used in the sequence counter circuit must be one-half the range, the least significant digit of the binary range information is eliminated before presentation at the terminal 11. The repetition period trigger or transmission pulse applied to terminal 13 may be taken from the radar magnetron transmitter in an attenuated form, such as the trigger signal to be used in the scope indicator of the radar. The above signals coming from radar B in this example are of the type which are readily recognized by those skilled in the art as being developed by tracking radar systems.

The radar sequencer circuit constituting this invention includes a sequence counter network 20 which is capable of counting electrical pulses and may be of any well recognized binary type counter herein shown to have a nine column digital count output. The sequence counter 20 has inputs 21 from "and" gates 22 for adding in one-half the radar range in bits or binary form coming over a cable from radar B via terminal block 11 when the "and" gates 22 are open. An input 23 to the sequence counter 20 allows the sequence counter to add in clock pulses or continuous frequency pulses, or the like. The input 24 to the sequence counter 20 is for receiving an electrical pulse which will reset the sequence counter to zero as is well understood by those skilled in the digital computer art. Nine outputs 25 through 33 from the sequence counter 20 provide the nine base output digits of this counter, although only three 25, 29, and 33 are shown in coupled circuit detail. It is believed that these three outputs 25, 29, and 33 to coupled circuits will be sufficient to illustrate and effectively describe this mode of the invention. It is to be understood that a more or less number of column or stage outputs can be used from the sequence counter 20.

Each synchronous pulse applied to terminal 12 is conducted by way of conductor means 35 to a bistable multivibrator 36 and by way of a branch circuit 37 as the second input to the "and" gates 22. When the synchronous pulse occurs, the range information in binary form will pass through the "and" gates 22 to add this binary range information into the sequence counter network 20. The synchronous pulse applied by way of conductor means 35 to the bistable multivibrator 36 will set this multivibrator in its "1" stage designated by "s" and "1" in the block 36. When the bistable multivibrator 36 is in its "1" state, a voltage output is applied over conductor 38 as one input to a clock pulse "and" gate 39 and as an input to a repetition period trigger pulse "and" gate 40. Other clock pulse "and" gates 41 and 42 along with the "and" gate 39 are coupled to receive the clock pulses from terminal 14 by the way of conductor means 43 as one input to each gate. The output of each of these "and" gates 39, 41, 42 is coupled through an "or" gate 44 the output of which is by way of the conductor means 23 to the sequence counter network 20. A second input to the "and" gate 40 is the repetition period trigger pulse source coming from the terminal 13 by way of the conductor means 45 and through a branch circuit 46 as one input to a second repetition trigger "and" gate 47. The output of the "and" gate 40 is coupled by a conductor means 48 to the reset terminal of the bistable multivibrator 36 and by a branch conductor means 49 to the "set" terminal of a bistable multivibrator circuit 50. Whenever the bistable multivibrator 50 is in its set or "1" state, a voltage output is applied over a conductor means 51 as the second input to the "and" gate 47 and over a branch conductor 52 to a blanking circuit terminal 15 effective to blank the B radar transmission of the pulse so long as the bistable multivibrator circuit 50 is in its set or "1" state. The output of the "and" gate 47 is by way of conductor 53 to reset the bistable multivibrator 50 and by way of branch conductor 54 to the "set" terminal of a bistable multivibrator circuit 55. When multivibrator 55 is in its set or "1" state, a voltage output is developed on the conductor means 56 which is applied as the second input to the "and" gate 41.

The output 25 of the sequence counter 20 is conducted as one input to a summing "and" gate K$l$. The outputs 26, 27, and 28 of the sequence counter 20 are conducted as one input to each of "and" gates not shown in between the "and" gates K$l$ and K$n$, the output 29 being conducted as one input to the summing "and" gate K$n$. Again for simplicity, the "and" gates to receive the outputs from the conductors 30, 31, and 32 are not shown, but the last output 33 from the sequence counter 20 is shown as being conducted as one input to the summing "and" gate K$m$. The second inputs to each of the summing "and" gates K$l$ through K$m$ are voltages applied thereto over conductors 60 through 68 from a multiple contact relay switching means 70. The conductors 60 through 68 to the summing "and" gates K$l$ through K$m$ are from the switch blades of the switch 70, each switch blade being alternately seatable on one of two contacts. Each of the contacts illustrated herein as the left contacts 71 through 79 is coupled respectively to preset direct current voltages V$l$ through V$m$. The right-hand contacts designated by the reference characters 81 through 89 are coupled respectively to preset voltages E$l$ through E$m$. The relay switch means 70 is normally biased to hold the switch blades to the left contacts 71 through 79 in its unenergized condition whereby voltages V$l$ through V$m$ are normally applied to the summing "and" gates K$l$ through K$m$ in one operational mode. The output of each of the summing "and" gates K$l$ through K$m$, when matched by the V$l$ through V$m$ voltages, is conducted by conductor means 91 through 99 to a single "and" gate 100 which will develop an output on the conductor 101 only when all of the summing "and" gate outputs 91 through 99 are present as inputs to the single "and" gate 100. The output from the single "and" gate 100 on the conductor means 101 is conducted by branch conductor 102 to the reset terminal of the bistable multivibrator 55, through a branch conductor 103 as one input to an output "and" gate 104, and through the branch conductors 105 and 106 to an "or" gate 107. The output of "or" gate 107 is the conductor 24 coupled to the reset terminal of the sequence counter 20. The output of the output "and" gate 104 is by way of conductor 108 to an output "or" gate 109 the output 110 of which is a conductor to the synchronizing circuit of the B radar. Since one mode of the circuit just described is complete in itself for delaying the synchronous pulse of a radar to produce a delaying synchronous pulse capable of making the radar to transmit a pulse that will arrive at a missile at a desired time, a statement of operation will be given for the mode of the circuit just described.

*Operation of First Mode*

Let it be assumed for the purpose of example and illustration that radar B and its synchronous and repetition period trigger or transmitter pulses, which are blanked in all four radars A, B, C, and D, are used in the sequencer circuit of FIGURE 1 to produce new synchronous pulses and transmitter pulses for radar B. The first synchronous pulse of radar B is applied at terminal 12 which will function to open the "and" gates 22 to allow the binary one-half range information coming from radar B over cable terminal block 11 to be immediately added in the sequence counter network 20. Simultaneously with this function the synchronizing pulse will set the multivibrator 36 in its "1" state to open gates 39 and 40. The opening of gate 39 allows clock pulses to pass therethrough and through the "or" gate 44 over the conductor means 23 to the sequence counter 20 whereby the clock pulses will be added in the sequence counter network 20 to the range count therein. The opening of gates 22 adds in the one-half range $Tm$ as shown in FIGURE 1 and the opening of gate 39 starts the addition of the clock pulses for a count representative of $Tp$ in FIGURE 1. The clock pulses passing through the "and" gate 39 will be cut off immediately at the time that the first repetition period trigger pulse or transmitter pulse from radar B is applied at terminal 13, completing the $Tp$ count, which repetition period trigger will pass through "and" gate 40 to reset the multivibrator circuit 36 and set the bistable multivibrator circuit 50. This conditions "and" gate 47 to pass the repetition period trigger pulse over the conductor means 46 through "and" gate 47 to reset the bistable multivibrator 50 and to set the bistable multivibrator 55, which at the same time blanks radar B from transmitting pulses by way of conductor means 52 for the period of time that the multivibrator 50 is in its "1" state. This blanks the radar from actually transmitting a pulse produced by the repetition period trigger pulse. If the repetition period trigger pulse is exceedingly short in duration, a delay line or pulse stretcher may be incorporated in conductor 46 to insure proper sequence of operation of elements 40, 47, 50 and 55. Immediately upon the bistable multivibrator 55 being set to its "1" state the voltage applied by way of conductor 56 to the "and" gate 41 opens this "and" gate to clock pulses which are conducted through "or" gate 44 and the conductor 23 to add in the count represented by the symbols $Ts+nTr$. The delay represented by the symbol $nTr$ is preset manually or otherwise by the nine voltages $Vl$ through $Vm$ to the summing "and" gates $Kl$ through $Km$ while the delay represented by the symbol $Ts$ is inherent in the sequencer circuit to present fixed delays by reason of the time required for operation of electronic components. As the count proceeds in the sequence counter network 20 to produce an output on the conductors 25 through 33 to the summing "and" gates $Kl$ through $Km$ matching the preset voltages $Vl$ through $Vm$, the outputs of the latter "and" gates will be applied to the single "and" gate 100. If the missile changes in range, as it most probably will, a target increasing in range will cause the $Tm$ time interval to lengthen out in FIGURE 1. Since $Tm$ will increase in length, the $nTr$ time will decrease a like amount of time although $Vl$—$Vn$—$Vm$ are preset and fixed. The increase in range produces a larger digital number in the sequence counter which requires less time to count up to the amount preset by $Vl$—$Vn$—$Vm$. In like manner if the range of the missile decreases, the time element of $nTr$ increases inversely with the decrease of $Tm$, but $Vl$—$Vn$—$Vm$ remain constant, to maintain the arrival time at the missile of the transmitter pulse constant. When the output of all summing "and" gates $Kl$ through $Km$ are present on the single "and" gate 100, an output voltage appears on conductor 101, which results in a synchronized repetition trigger pulse for radar B which will produce a pulse at the missile at the end of a time represented by the symbol $Td$ in FIGURE 1, which is the combination of the count $Tp+Ts+nTr$ heretofore described and the pulse travel time $Tm$. The time $Td$ remains constant since it is the time from the primary synchronous pulse to the desired time of illuminating the missile with the transmitted pulse. $Td$ is changed only if the voltages $Vl$—$Vn$—$Vm$ are changed. But the delayed pulse on the output of the sequencer is the synchronous or synthetic pulse which actually triggers the radar B transmitter, as later will become clear. This output pulse on the conductor 101 will pass through the "and" gate 104 (for reasons soon to be described) and over conductors 108 and 110 to the radar B as a new synchronizing pulse to trigger radar B to establish pulse arrival times at the missile shown in the first line as $Bn-1$, $Bn$, and $Bn+1$. These pulse arrival times at the missile are produced by transmitter pulses which have been delayed by time periods $Tp+Ts+nTr$ shown by the line "Synchronized Repetition Period" in FIGURE 1. Also, at the time this new synchronizing pulse is conducted over the conductor 101, this pulse is likewise conducted over branch conductor 102 to reset bistable multivibrator 55 to cut off the passage of the clock pulse through the "and" gate 41 and also, by way of conductors 105 and 106 through the "or" gate 107 to reset the sequence counter 20 by way of the conductor means 24. This latter action is so rapid electrically that the output voltage on 101 is really a pulse, as aforesaid. The count of clock pulses through the "and" gate 41, then, are the clock pulses equivalent to the time interval represented by the symbols $nTr$, the preset delay in the voltages $Vl$ through $Vm$. The fixed delay in the radar represented by the symbol $Ts$ is counted in by virtue of the time consumed to count in $nTr$. As shown in FIGURE 1, the time intervals $Ts$, $nTr$, and $Tm$ from the original transmitted pulse produce the desired time of the pulse arrival at the missile as shown by the next to the bottom line in FIGURE 1 which is proved as the actual arrival time of the pulses from radar B in the bottom line of FIGURE 1. Where the range of the missile is changing, $Tm$ and $nTr$ are changing inversely, as may be recognized in FIGURE 1, by shifting the synchronized repetition period transmitted pulses (third time scale from the bottom of FIGURE 1) of radar B to the left or right to cause the missile to be illuminated precisely at the point $Bn-1$, $Bn$, and $Bn+1$. Where each of the radars A, B, C, and D are in chain with the same synchronizing pulse applied thereto and each has a preset delay applied thereto in the voltages $Vl$ through $Vm$ in its sequencer circuit, the radar can be made to transmit pulses in a sequence by adjusting $Vl$ through $Vm$ to cause the transmitted pulses to arrive at the tracked missile at intervals shown in the first line of FIGURE 1. In this manner there can be no gate stealing by any of the radars by virtue of transmitted pulses from the radars arriving simultaneously or so closely in sequence that some become ineffective. With the radar sequencer circuit used with each radar A, B, C, and D, as described hereinabove, adjusting for the preset delays $n=0$, 1, 2, 3, for the $nTr$ in each sequencer circuit, each radar will receive echo pulses for accurate tracking of the missile. This is especially true where the missile carries or utilizes a beacon for beaconing back these echo signals.

*Second Mode*

Where $n$th time around targets are being tracked, it is possible for the above described invention to have the transmitter pulses for each radar, such as radar B of the example, to arrive at the missile, not at the desired time, but at a half repetition period earlier to avoid the occurrence of the echo pulse from the missile at the time that a new pulse is being transmitted. For this mode the radar, such as radar B in the example of FIGURE 1, as well as radars A, C, and D, should have an even zone indicator means capable of producing direct current (D.C.) voltages in one state to indicate that the target is in an odd zone and in another state to indicate that the target is in an even zone. That is, when echo signals are being received at the precise time that signals are being transmitted causing echo signal interference by transmitted signals, the radar is operating under conditions of "second time around" or "$n$th time around" target tracking in the even zone. This condition can readily be recognized and the radar may be equipped with means to so indicate the condition by an even zone indicator to indicate if the echo pulses are arriving at the same time pulses are being transmitted, or from the even zones, or if these echo pulses are arriving in between transmitted pulses, or from the odd zones. The radars may be any of the well known range tracking pulse radars of the type discussed in the above-mentioned text, Radiation Laboratory Series, chapter 1. These signals are adapted to be applied to a terminal 10 in FIGURE 2 which will have, for illustrative example, a negative voltage applied under conditions when there are no even time around echoes and a positive direct current voltage applied to terminal 10 for the even zone. The latter occurs when radar B is tracking an even time around echo. To get the additional delay of $$\frac{Tf}{2}$$

the sequence counter 20 is reset but permitted to continue counting until the voltages $El$ through $Em$ are matched in the summing "and" gates $Kl$ through $Km$. This is accomplished by coupling the terminal 10 having the even zone indicator bus electrical information from radar B thereon by way of conductor 120 and branch conductor 121 as one input to an "and" gate 122. The second input to "and" gate 122 is the output synchronizing pulse from the single "and" gate 100 over the conductors 101 and 105. The even zone D.C. voltage information is likewise conducted by the conductor 120 and branch conductor 123 through an inverter network 124 as the second input to the output "and" gate 104. In the presence of one state of a voltage signal on terminal 10 such as a negative D.C. voltage level, the "and" gate 104 is conditioned to pass a pulse coming over conductors 101 and 103 as hereinabove stated in the operation of the first mode of this invention for odd zone echo signal reception. When an even zone voltage signal does occur on terminal 10 such as a positive D.C. voltage level, the output "and" gate 104 is ineffective to pass synchronous pulses from the single "and" gate 100 over the conductor means 101 and 103 by virtue of inverter 124. The output of "and" gate 122 is applied to a bistable multivibrator circuit 125 to set same in its "1" state. In this "1" state of multivibrator 125 a voltage output is applied over the conductor means 126 through the relay coil of the relay switch 70 to throw all the switch blades to the right-hand contacts 81 through 89 thereby applying the voltages $El$ through $Em$ to the summing "and" gates $Kl$ through $Km$. The multivibrator 125 in its "1" state also applies a voltage through the conductor means 127 and branch conductor 128 as the second input to the "and" gate 42 opening this "and" gate 42 to the passage of clock pulses through the "or" gate 44 and the conductor means 23 to the sequence counter 20. Likewise the voltage on conductor 127 is applied through the branch circuit 129 as one input to a bypass "and" gate 130, the second input of which is from the single "and" gate 100 via the conductors 101, 105, and 131. The output bypass "and" gate 130 is by one branch conductor 132 to the reset terminal of the multivibrator circuit 125, and through the branch conductor 134 to the "or" gate 109. With this additional circuitry the output synchronous pulse can be additionally delayed by an amount equal to one-half the pulse repetition frequency by properly presetting the voltages $El$ through $Em$.

*Operation of Second Mode*

In the operation of the second mode of this invention, when the radar sequencer circuit is operating as described in the operation of the first mode of this invention, and the even zone indicator of radar B produces a signal state indicating that the radar is tracking on an even time around number of echoes, this signal will be applicable through "and" gate 122 during the presence of the synchronizing pulse from a single "and" gate circuit 100 on output 101 to set the bistable multivibrator in its "1" state and to cut off "and" gate 104 through the inverter 124. In this instance, the synchronizing pulses from the single "and" gate 100 conducted over the conductors 101 and 103 will be blocked at the output "and" gate 104. The setting of the bistable multivibrator 125 opens "and" gate 42 to pass clock pulses through the "or" gate 44 and the conductor 23 to cause the sequence counter 20 to count although it has been reset by the synchronizing pulse output of "and" gate 100 by way of the conductor means 101, 105, 106, and 24. The sequence counter 20 will now count until the outputs of conductors 25 through 33 applied to the summing "and" gates $Kl$ through $Km$ are matched by the voltages applied to the summing "and" gates from the preset $El$ through $Em$ voltages. The setting of multivibrator 125 to its "1" state switches 70 to apply voltages $El$ through $Em$. When the outputs 91 through 99 on all of the summing "and" gates are applied to the single "and" gate 100, another synchronizing pulse will be developed over conductor 101 which will be conducted via the conductor 131, "and" gate 130, over conductor 134, and through "or" gate 109 to the output 110. This last synchronizing pulse will be effective through conductors 101, 105, 106, and 24 to again reset the sequence counter 20. Likewise, the output from the bypass "and" gate 130 is by way of conductor means 132 to reset the bistable multivibrator 125 to its zero state. This operation will be repeated as long as even zone voltage signals are applied to the terminal 10 which will cause radar B (and likewise radars A, C and D where like sequencer circuits are used) to produce a sequence of pulses from radars A, B, C, and D to arrive at the missile at the desired time as hereinabove stated for the first mode statement of operation by introducing a delay of one-half the pulse repetition period to compensate for the undesired change in delay of one-half the repetition period which is introduced when a target is being tracked in the $n$th time around mode and happens to be in the even zone. In this manner the even time around echo signal interference with transmitted pulses can be eliminated in the operation of this system.

While many modifications and changes may be made in the constructional details and features of this invention to accomplish the results and functions set out in this description, it is to be understood that I desire to be limited only by the scope of the appended claims.

I claim:

1. A sequencer counter circuit for controlling the transmission sequence of a plurality of radars comprising: a sequencer counter for counting electrical pulses for each of a plurality of tracking radars; a clock pulse input; a synchronous pulse input; a repetition period pulse input; a system of gating means initiated by application of synchronous pulses from the synchronous pulse input to add pulses representative of the range to an object in said sequencer counter, to gate clock pulses to said sequencer counter representative of the time interval between each synchronous pulse and a corresponding repetition period pulse, and to gate clock pulses to the sequencer counter representative of a preset delay time; and means coupled to said system of gating means to produce output delayed synchronous pulses for said radar to synchronize delayed repetition period pulses to produce delayed transmitter pulses of the radar to cause each transmitted radar pulse to arrive at said object at a desired time whereby a plurality of radars can be caused to make the transmitted pulse of each to arrive at the object in a desired sequence.

2. A sequence counter circuit for controlling the transmission sequence of a plurality of radars, each sequence counter circuit for each radar comprising: a synchronous pulse input to apply synchronous pulses originally synchronizing the pulse transmission of the radar; a repetition period trigger pulse input to apply repetition period trigger pulses originally coinciding with the transmitted pulses; a sequence counter for counting electrical pulses; an input of clock pulses; gating means coupled to said input of clock pulses and to said sequence counter for gating clock pulses to said sequence counter, said gating means being gated by synchronous pulses from said synchronous pulse input, the pulses from said repetition period trigger pulse input, and preset voltages coupled thereto, synchronous pulses from said synchronous pulse input being applicable to gate the count representative of the range to an object into said sequence counter, synchronous pulses and repetition period trigger pulses being applicable to gate the number of clock pulses into said sequence counter representative of the time interval between each synchronous pulse and a corresponding repetition period trigger pulse, and synchronous pulses and the preset voltages being applicable to gate the number of clock pulses into said sequence counter representative of a preset delay time; and means coupled to said sequence counter ot produce delayed output synchronous pulses for said radar whereby the radar can be synchronously pulsed in a predetermined sequence with a plurality of radars to cause transmitted pulses of each of the radars produced by the delayed output synchronous pulses to arrive at the object at desired fixed intervals.

3. A sequence counter circuit as set forth in claim 2 wherein said gating means includes three bistable multivibrators and five "and" gates, the first and second of said five "and" gates having said input of clock pulses connected as one input to each thereof and the output of each thereof being through an "or" gate to said sequence counter, the first of said three bistable multivibrators having said synchronous pulse input coupled as an input thereto and to the third of said five "and" gates, said third "and" gate having as a second input a pulsed signal representing radar range with the output connected to said sequence counter, said first bistable multivibrator applying a voltage to said first "and" gate and to the fourth of said five "and" gates under one of its stable states to pass clock pulses applied as an input to said first "and" gate from said input of clock pulses and to pass repetition period trigger pulses applied as a second input to said fourth "and" gate, the output of said fourth "and" gate being coupled to said first bistable multivibrator to reset same and being coupled to the second of said three bistable multivibrators to switch said second bistable multivibrator to one of its stable states upon passage of a repetition period trigger pulse to apply a voltage to the fifth of said five "and" gates to which fifth "and" gate said repetition period trigger pulses are applied as a second input, and the third of said three bistable multivibrators receiving the output of said fifth "and" gate to set same in one of its stable states to apply a voltage as another input to said second "and" gate allowing clock pulses to pass said second "and" gate and said connected "or" gate to said sequence counter, the output of said fifth "and" gate being coupled to reset said second bistable multivibrator to the other of its stable states, and the output of said means coupled to said sequence counter to produce delayed synchronous pulses for the radar being coupled to reset said third bistable multivibrator to its other stable state.

4. A sequence counter circuit for controlling the transmission sequence of a plurality of radars, each sequence counter circuit for each radar comprising: a synchronous pulse input to apply synchronous pulses originally coupled to the radar to synchronize pulse transmission; a repetition period trigger pulse input to apply repetition period trigger pulses originally coinciding with the radar transmitted pulses; a range count input; a sequence counter for counting electrical pulses; a clock pulse input; gating means coupled to said clock pulse input, to said synchronous pulse and repetition period trigger pulse inputs, to preset voltages, and to said sequence counter, said gating means being gated by synchronous pulses, repetition period trigger pulses, and said preset voltages, synchronous pulses being applicable to gate into the sequence counter the count representative of the range to an object from said range count input, synchronous pulses and repetition period trigger pulses being applicable to gate into the sequence counter the number of clock pulses representative of the time interval between each synchronous pulse and a corresponding repetition period trigger pulse, and synchronous pulses and the preset voltages being applicable to gate into the sequence counter the number of clock pulses representative of a preset delay time; delayed synchronous pulse producing means coupled to said sequence counter and to said preset voltages to produce on an output thereof delayed synchronous pulses; and an additional delay means coupling the output of said delayed synchronous pulse producing means, said gating means, and said sequence counter to cause said gating means to gate clock pulses into the sequence counter for a predetermined time interval in addition to those gated into the sequence counter by said synchronous pulses and said repetition period trigger pulses whereby the radar can be synchronously pulsed in a predetermined sequence with a plurality of radars to cause the transmitted pulses thereof to arrive at an object common to all at desired fixed intervals of time.

5. A sequence counter circuit as set forth in claim 4 wherein said preset voltages are under the control of said additional delay means to present predetermined preset voltages under one mode where said additional delay means is inoperative to produce additional delay of said synchronous pulses and to present other preset voltages under another mode where said additional delay means is operative to produce additional delay in said synchronous pulses.

6. A sequence counter circuit as set forth in claim 5 wherein said delayed synchronous pulse producing means includes an "and" gate for each counter output of said sequence counter to which "and" gates are applied said preset voltages, and the outputs of all said "and" gates being coupled as inputs to a single "and" gate the output of which conducts said delayed synchronous pulses, said preset voltages under the control of said additional delay means being through alternately seated switch elements, the switch blades thereof being connected respectively to one each counter "and" gate and each of the alternate contacts of each alternately seated switch being connected to a preset voltage, and said alternately seated switch being electrically controlled by an output of said additional delay means.

7. A sequence counter circuit as set forth in claim 6 wherein said gating means includes three bistable multivibrators and six "and" gates, the first, second, and third of said six "and" gates having said clock pulse input connected as one input to each thereof and the output of each thereof being through an "or" gate to said sequence counter, the first of said bistable multivirators having said synchronous pulse input coupled as an input thereto and to the fourth of said "and" gates, said forth "and" gate having as a second input a pulsed signal representing said range with the output connected to said sequence counter, the first of said bistable multivibrators applying a voltage to said first of said "and" gates and to the fifth of said six "and" gates under one of its stable states to pass clock pulses applied as an input to said first "and" gate from said clock pulse input and to pass repetition period trigger pulses applied as an input to said fifth "and" gate, the second of said multivibrators being coupled to the output of said fifth "and" gate to switch said second multivibrator to one of its stable states upon passage of a repetition period trigger pulse to apply a voltage to the sixth of said six "and" gates to which sixth "and" gate said repetition period trigger pulses are applied as an input, and the third of said three multivibrators receiving the output of said sixth "and" gate to set same in one of its stable states to apply a voltage as another input to said second "and" gate allowing clock pulses to pass said second "and" gate and said connected "or" gate to said sequence counter, the output of said sixth "and" gate being coupled to reset said second multivibrator to the other of its stable states and the output of said single "and" gate being coupled to reset said third multivibrator to its other stable state, and said additional delay means being coupled to the other input of said third "and" gate to apply a voltage to the third "and" gate to pass clock pulses therethrough when said additional delay means is operative to delay said synchronous pulses.

8. A sequence counter circuit as set forth in claim 7 wherein said additional delay means includes an output "and" gate having the output of said single "and" gate as one of its inputs and another input from an even zone indicator bus input of the radar, and an output "or" gate coupling the output of said output "and" gate, and said even zone indicator bus input being coupled to a bistable multivibrator to switch same to one of its stable states, this one stable state conditioning the third of said six gating means "and" gates to pass said clock pulses to said sequence counter, and conditioning a bypass "and" gate being coupled to pass the output from said single "and" gate through said output "or" gate.

9. A sequence counter circuit for controlling the transmission sequence of a plurality of radars, each sequence counter circuit comprising: a sequence counter for counting electrical pulses; an input of range information in binary form, an input of synchronous pulses, an input of repetition period trigger pulses, and an input of even zone indicator bus electrical information adapted to be received from one of said plurality of radars; a clock pulse input; a synchronous pulse and clock pulse gating means including three two-input clock pulse "and" gates, a two-input range "and" gate, two two-input repetition period trigger "and" gates, and three bistable multivibrators, said repetition period trigger "and" gates each having one input thereof coupled to said repetition period trigger input, said three clock pulse "and" gates being coupled to said clock pulse input to have clock pulses applied as one input thereto and one thereof having the set output of the first of said three bistable multivibrators coupled as the other input with the output of said three clock pulse "and" gates coupled through a sequencer "or" gate to said sequence counter to count clock pulses applied therethrough, said set output of said first multivibrator being coupled also as one input of one of said repetition period trigger "and" gates, said range "and" gate being coupled to receive said range information and said synchronous pulses to pass said range information to said sequence counter upon the occurrence of a synchronous pulse, said first bistable multivibrator having said synchronous pulses coupled thereto to set same with the output of one of said repetition period trigger "and" gates coupled to reset said first bistable multivibrator and to set the second of said three bistable multivibrators, the set output of said second multivibrator being coupled as the second input to the other of said repetition period trigger "and" gates, and the third of said three bistable multivibrators being coupled to the output of the other of said repetition period trigger "and" gates to set same when a repetition period trigger pulse is present, the set voltage being applied as the other input to the second of said three clock pulse "and" gates; a delay synchronous pulse means including a summing "and" gate for each output stage of said sequence counter and coupled to receive stage outputs as one input to each summing "and" gate, the outputs of all summing "and" gates being coupled as an input to a single "and" gate the output of which produces a delayed synchronous pulse, and the other inputs to said summing "and" gates being alternately switchable by switch means from first and second sources of preset voltages, the switch means being normally biased to connect said first preset voltages; and an additional delay means including an even zone two-input "and" gate having as one input said input of even zone indicator bus electrical information and as the other input the delayed synchronous pulse from said single "and" gate with an output coupled to set a delay means bistable multivibrator, said bistable multivibrator means applying a voltage in its set state to switch said switch means to its alternate position and to apply said voltage as the other input of the third of said clock pulse "and" gates and as one input of a bypass "and" gate, the other input of said bypass "and" gate being coupled from the output of said single "and" gate, the output of said bypass "and" gate being coupled to an output "or" gate, and to the reset of said delay means bistable multivibrator, one output of said single "and" gate being through a sequence counter reset "or" gate to reset said sequence counter to zero, and an output two-input "and" gate having one input from the output of said single "and" gate and the other input from said input of even zone indicator bus electrical information with the output thereof to said output "or" gate whereby the delayed synchronous signal from said output "or" gate is selectable from said alternate preset voltages to delay said synchronous pulses a predetermined time interval in one selected condition and to delay said synchronous pulses an additional time interval to said predetermined time interval.

No references cited.